United States Patent
Walker

(10) Patent No.: US 6,434,234 B1
(45) Date of Patent: Aug. 13, 2002

(54) PROCESS FOR IMPROVING THE ECHO SUPPRESSION IN A TELECOMMUNICATIONS SYSTEM

(75) Inventor: Michael Walker, Baltmannsweiler (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/427,684

(22) Filed: Oct. 27, 1999

(30) Foreign Application Priority Data

Oct. 31, 1998 (DE) .......................................... 198 50 272

(51) Int. Cl.⁷ ................................................ H04M 9/08
(52) U.S. Cl. ............................ 379/406.06; 379/406.08; 379/406.01; 379/406.03; 379/406.05; 379/406.09; 379/406.04
(58) Field of Search ................................ 379/400–412; 455/399; 375/224–235

(56) References Cited

U.S. PATENT DOCUMENTS

| | | |
|---|---|---|
| 4,236,048 A | 11/1980 | Olney |
| 5,455,819 A | 10/1995 | Sugiyama |
| 5,535,194 A | 7/1996 | Ashley et al. |
| 5,784,406 A * | 7/1998 | DeJaco et al. ............... 375/224 |
| 5,848,151 A * | 12/1998 | Boundy et al. ............. 379/410 |
| 5,901,230 A * | 5/1999 | Walker ................... 379/388.07 |
| 5,920,548 A * | 7/1999 | El Malki ..................... 379/410 |
| 6,044,068 A * | 3/2000 | El Malki ..................... 379/410 |
| 6,249,581 B1 * | 6/2001 | Kok ........................... 379/406 |

FOREIGN PATENT DOCUMENTS

| | | |
|---|---|---|
| DE | 42 299 10 | 9/1992 |
| DE | 43 025 256 A1 | 8/1994 |
| DE | 197 14 966 A1 | 10/1998 |
| EP | 05 092 787 B1 | 12/1998 |

\* cited by examiner

Primary Examiner—Forester W. Isen
Assistant Examiner—Ramnandan Singh
(74) Attorney, Agent, or Firm—Sughrue Mion, PLLC

(57) ABSTRACT

In accordance with the invention, from the characteristic curve of the speech signal there are derived pulse sequences which are dependent upon the frequency but not the amplitude of the speech signal, so that in the case of a real echo, independently of the attenuation, identical pulse sequences occur in the case of the transmitted signal and, with a time shift, in the case of a received echo. The correspondence between the pulse sequences of transmitted signal and received signal is an indication that the received signal is an echo of the transmitted signal.

4 Claims, 3 Drawing Sheets

PROCESS FOR IMPROVING THE ECHO SUPPRESSION IN A TELECOMMUNICATIONS SYSTEM

BACKGROUND OF THE INVENTION

The invention relates to a process for improving the echo suppression in a telecommunications system in which undesired electric coupling occurs between a receiving path and transmitting path and gives rise to disturbing echos, so-called line echos. In handsfree telephones and auditorium sound systems, echos, so-called acoustic echos, can also occur due to acoustic coupling between loudspeaker and microphone. In order to be able to successfully carry out an echo suppression, the degree of coupling between transmitting path and receiving path must be defined by a coupling factor CF which indicates the ratio of the signal energy received at the echo reception location to the signal energy transmitted at the echo source. The echo signal y(k) is delayed by the echo delay time i relative to the transmitted signal x(k) so that the coupling factor is $$CF = \frac{\sum_{k=0}^{N}(y(k))^2}{\sum_{k=0}^{N}(x(k-i))^2} \quad (E1)$$

wherein

| | | |
|---|---|---|
| x(k − i) | = | sample value of the transmitted signal |
| y(k) | = | sample value of the received signal, delayed by the echo delay time i |
| N | = | number of sample values of the exciting signal |
| i | = | echo delay time |

An essential problem in defining the coupling factor CF consists in determining the echo delay time i in Equation (E1) as accurately as possible. To determine the echo delay time i it is necessary to ascertain when the transmitted signal arrives at the echo reception location. As telecommunications systems are generally operated bidirectionally, the echo signal can be superimposed by a signal fed-in as useful signal at the remote end of the transmission path. This is the case whenever speech occurs simultaneously at both ends of the transmission path. This is the so-called double talk situation. In defining the coupling factor CF it is necessary to ensure that the echo delay time i is correctly set and that no double talk is occurring. The clear identification of an echo is a general problem in all possible transmission situations.

To detect an echo it is known to perform a correlation analysis in which the transmitted signal x(k) is recorded in a time interval k=0 . . . N and compared with the signal y(k) incoming at the reception location, see DE-A-42 29 910. The degree of correlation ρ then indicates the probability as to whether an echo is present, ρ=1, or a mixed signal is present, ρ=0. The decision as to whether the correlation degree ρ is to be interpreted as an echo or as a mixed signal produced by double talk, is made by a threshold value γ. The greater the selected threshold value γ, the less often are existing echos detected. Thus incorrect decisions are frequently made and the adaptation of the system is blocked. If on the other hand too low a threshold value γ is selected, the danger exists that the system will be adapted in double talk operation and become unstable. The calculation outlay for the correlation analysis, comprising N multiplications, N adaptations and one division, is very high whereas the echo detection reliability is unsatisfactory.

SUMMARY OF THE INVENTION

The invention fulfils the objective of providing a process for improving the echo suppression in a telecommunications system which facilitates precise differentiation between echos and double talk, and thus the reliable detection of echos, in particular line echos, whose delay time can amount to up to 640 ms and which can occur up to five times within 64 ms.

Invention, by a process wherein pulse sequences are derived from the characteristic curve of the speech signal as special speech features which are dependent upon the frequency but not the amplitude of the speech signal, so that in the case of a real echo in linear transmission systems, independently of the attenuation of the echo, identical but time-shifted pulse sequences occur in the case of the transmitted signal and in the case of a received echo. The correspondence between the time interval sequences of transmitted signal and received signal is an indication that the received signal is an echo of the transmitted signal. The time shift between the pulse sequences is a measure of the echo delay time i.

BRIEF DESCRIPTION OF THE DRAWINGS

The invention will now be explained in the form of an exemplary embodiment. In the associated drawings.

DETAILED DESCRIPTION OF THE INVENTION

Figure 1:
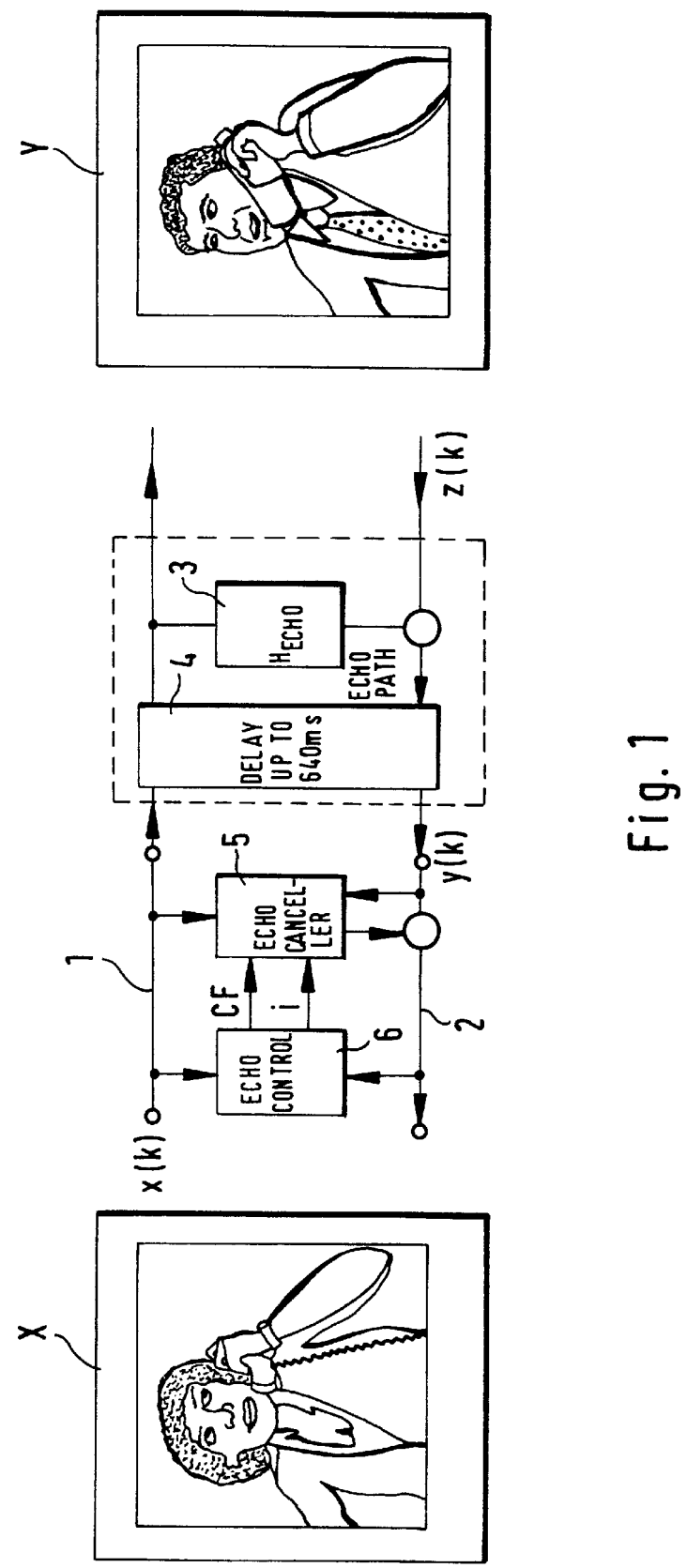
FIG. 1 is a general view of a transmission link affected by an echo.

In explanation of the facts, FIG. 1 shows a local subscriber X connected via a transmitting path 1 and a receiving path 2 to a subscriber Y at the remote end of the transmission link. The properties of the transmission link are symbolised by an echo generator 3 and a delay element 4. The local subscriber X is assigned an echo compensator 5, the parameters of which are set by a control circuit 6 via the value of the coupling factor CF and the delay time i of an echo.

Figure 2:
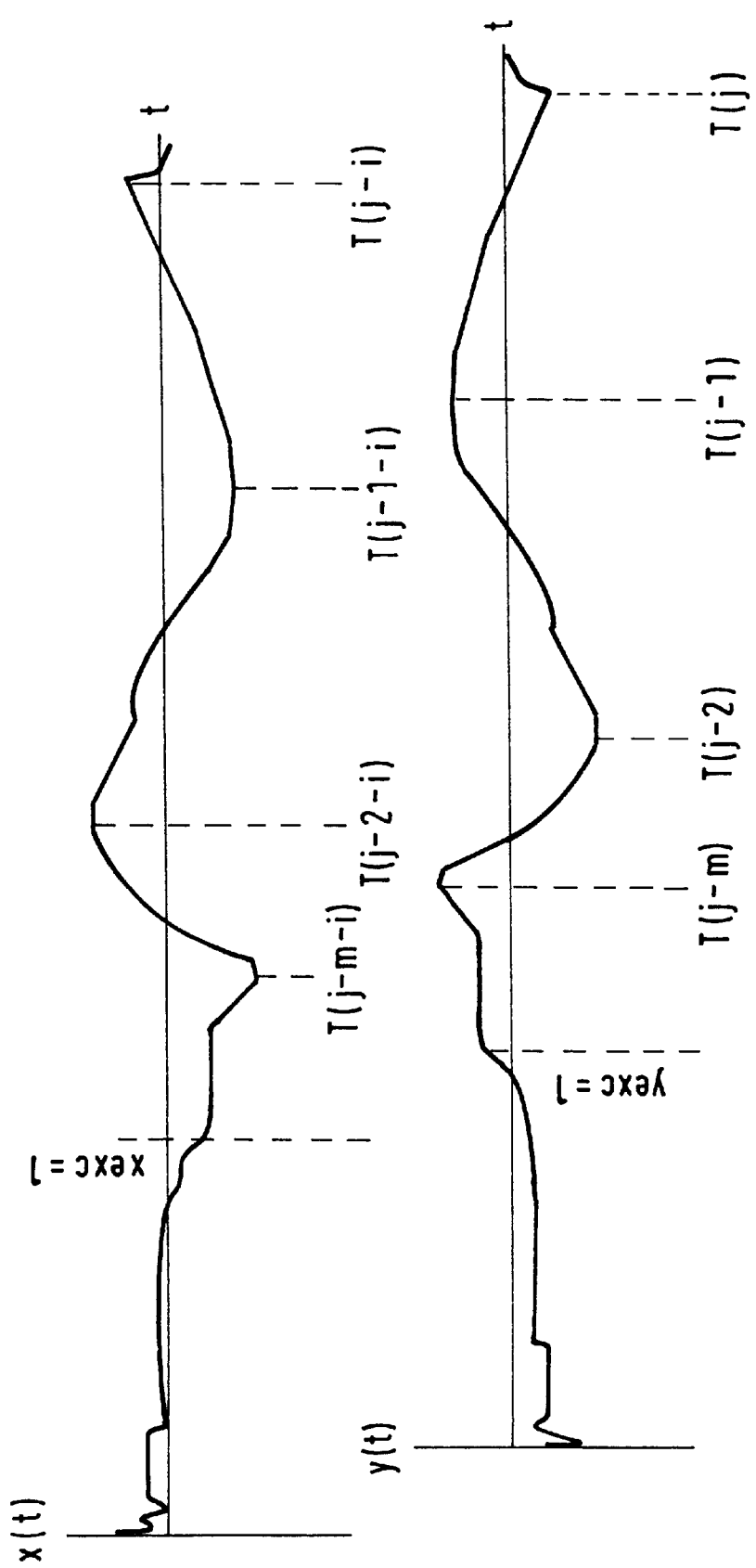
FIG. 2 is a diagram of the transmitted time function x(t) and the received time function y(t) and FIG. 3 is a diagram of a transmitted time function x(t) with the associated pulses at the time of the local extreme values of the transmitted time function x(t).

In FIG. 2 the upper diagram illustrates the time function x(t) of a speech signal of the local subscriber X and the lower diagram illustrates the time function y(t) of a signal received by the local subscriber X. In FIG. 2 the time function y(t) represents an echo originating from the transmitted signal x(t) which is rotated by 180° relative to the transmitted signal and delayed by an echo delay time i.

In both time functions, locations of local extreme values, for example T(j), T(j−i); T(j−1), T(j−1−i) are marked. FIG. 1 illustrates the sampling functions x(k) of the transmitted time function x(t) and y(k) of the received time function y(t), although the corresponding A/D converter for the transmitted time function x(t) and the D/A converter for the received sampling function y(k) have not been shown.

In order to precisely determine the coupling factor CF and the echo delay time i, it is essential to perform a measurement of these variables only when it is ensured that the transmitted signal x(t) and the received signal y(t) originate from one source, and in particular measurement must not take place in the case of a double talk situation. The detection of a real echo must take place reliably, rapidly and with a low storage and calculation outlay.

The process for reliably detecting an echo is based on defining local extreme values in the case of the transmitted time function x(t) and in the case of the received time function y(t), the sampling functions x(k) and y(k) being used to define the local extreme values. For the sampling function x(k) of the transmitted signal, a local extreme value is defined as follows:

$$k_j = \text{sign}(x(k_{j+1}) - x(k_j)) \neq \text{sign}(x(k_j) - x(k_{j-1})) \tag{E2}$$

The time difference between two local extreme values then becomes:

$$T_j = k_j - k_{j-1} \tag{E3}$$

For the sampling function y(k) of the received signal, a local extreme value $k_j$ is defined similarly as in Equation E2. As the time difference between two local extreme values is dependent upon the characteristic curve of the speech signal but not upon the amplitude of the speech signal, the same time difference $T_j$ according to Equation E3 occurs both in the case of the sampling function x(k) of the transmitted signal and in the case of the sampling function y(k) of an echo. If each local extreme value is now marked with a pulse, identical pulse sequences occur in the case of the transmitted signal and in the case of the received signal. The times of the local extreme values have been entered in FIG. 2. Such a pulse sequence is a characteristic of a speech sequence which, in the case of an echo, results in:

$$T(j-m) - T(j-m-i) = T(j) - T(j-i) = \text{const.} = i \tag{E4}$$

If the first local extreme value of the transmitted signal is used as start time for the echo delay time measurement, the first local extreme value of the received signal is the stop time for the echo delay time measurement. To avoid incorrect measurements, it is expedient not to use at least the first time interval following the excitation xexc=1 by the local subscriber X and correspondingly at least the first time interval following the excitation yexc=1 by the received signal. This ensures that the speech level reliably stands out from a possible background noise and the time function then permits a more accurate measurement.

A measure of the similarity between the signals to be investigated is derived from the pulse sequence of the local extreme values of the transmitted signal x(t) and of the received signal y(t). For this purpose, time interval differences are formed from the extreme values T(j) in each transmission direction in accordance with Equations E5 and E6, and from these a degree of similarity is calculated from the sum of the time interval differences in accordance with Equation E7.

$$dy(m) = T(j-m) - T(j-m-1) \tag{E5}$$

$$dx(m) = T(j-i-m) - T(j-i-m-1) \tag{E6}$$

where m=0,1,2 ... n $$\rho(x,y) = \sum_{m=0}^{n} |dx(m) = dy(m)| \tag{E7}$$

In the event that the pulse sequences correspond to one another, the time interval differences dy(m) and dx(m) are equal and the degree of similarity $\rho(x,y)=0$. Depending upon the value of the sampling frequency, this degree of similarity $\rho(x,y)$ will also differ from zero in the case of corresponding pulse sequences. With a decision threshold $\gamma$ it is ascertained whether the received sampled signal y(k) is an echo or possibly originates from double talk. A state variable is set accordingly, namely:

$$dtalk = \begin{cases} 1 & \text{if } \rho(x,y) > \gamma \\ 0 & \text{else (echo present)} \end{cases} \tag{E8}$$

If the degree of similarity $\rho(x, y)$ is greater than the decision threshold $\gamma$, the pulse sequences do not correspond to one another and a double talk situation, dtalk, is present. The parameters, coupling factor CF and echo delay time i, then cannot be calculated. If the degree of similarity $\rho(x, y)$ is smaller than the decision threshold $\gamma$, an echo exists and coupling factor CF and echo delay time i can be calculated.

The determination of the degree of similarity $\rho(x, y)$ requires for example only five time intervals for the time interval differences dy(m), dx(m) to permit an accurate evaluation. This results in a considerable reduction in storage outlay and calculation outlay compared to the correlation analysis known from the prior art, see DE-A-42 29 910, for the identification of an echo. The process is also suitable for comparing an echo with an echo simulated by a FIR filter. The degree of similarity is then used to control the incrementation of the echo compensator.

Figure 3:
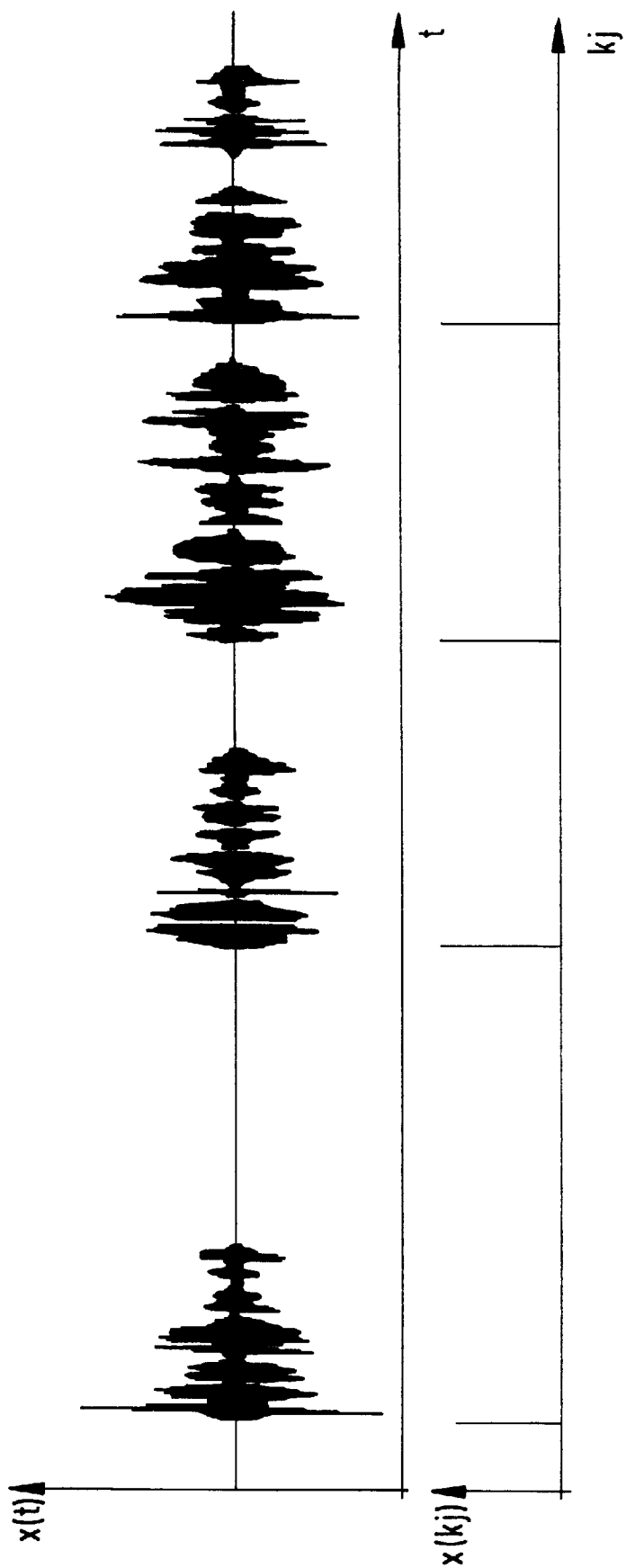

FIG. 3 illustrates a possibility of generating a characteristic pulse sequence. The upper diagram represents a speech sequence as a time function x(t). Following each speech pause, a pulse is set only in the case of the first local extreme value following the speech pause, so that the pulse sequence $x(k_j)$ illustrated in the lower diagram occurs. Similarly, the received signal y(t) is also characterised by a pulse sequence $y(k_j)$. This variant permits a simple evaluation of the pulse sequence of transmitted signal and received signal. In order to render the pulse sequences independent of possible noise signals, it is expedient to filter the speech sequences in both transmission directions in each case using a low-pass filter, so that then local extreme values originate only from speech and not from possible disturbances.

In bidirectional speech transmission, the process according to the invention enables those time segments of the speech transmission which are suitable for defining the coupling factor CF and the echo delay time i to be determined, in order then to be able to set the parameters of an echo compensator or compander as a function thereof.

I claim:

1. A process for improving the echo suppression in a telecommunications system in which an exchange of information takes place between a local subscriber (X) and a subscriber (Y) at the remote end of a transmission link, and at least one subscriber (X, Y) is assigned an echo suppressor (5), the parameters of which are set via a control circuit (6) as a function of an echo coupling factor (CF) and an echo delay time (i), characterised in that during the exchange of information between the subscribers (X, Y) the time segments for the calculation of the echo coupling factor (CF) and the echo delay time (i) are determined in such manner that from the signal (x(t)) transmitted by a subscriber and from the signal (y(t)) received by a subscriber the positions of the extreme values of the time functions of the transmitted signal and received signal (x(t);y(t)) are in each case determined and marked with a pulse, so that pulse sequences (x(kj);y(kj)) are formed which are stored and compared with one another, and that in the event that the pulse sequences (x(kj);y(kj)) correspond to one another, the received signal (y(t)) originates from the transmitted signal (x(t)) and thus is recognised as an echo, and that then the echo coupling factor (CF) and the echo delay time (i) are calculated.

2. A process according to claim 1, characterised in that the echo delay time (i) is determined from the time shift between the pulse sequence (y(kj)) formed from the received signal (y(t)) and the pulse sequence (x(kj)) formed from the transmitted signal (x(t)).

3. A process according to claim 1, characterised in that the comparison between the pulse sequences formed from transmitted signal (x(t)) and received signal (y(t)) is performed in such manner that, in a defined time interval, in each pulse sequence (x(kj,),y(kj)) the time interval difference (dx(m), dy(m)) between two consecutive extreme values is in each case formed, and that these time interval differences (dx(m), dy(m)) are subtracted from one another, the correspondence between the pulse sequences being the better, the smaller the difference between the time interval differences (dx(m),dy(m)).

4. A process according to claim 3, characterised in that the amount of the difference (|dx(m)−dy(m)|) between the time interval differences (dx(m),dy(m)) is a measure of similarity ($\rho(x, y)$) between the pulse sequences (x(kj),y(kj)), which is compared with a defined threshold value ($\gamma$).

* * * * *